(12) United States Patent
Bader

(10) Patent No.: US 6,195,008 B1
(45) Date of Patent: Feb. 27, 2001

(54) METHOD AND AN APPARATUS FOR MONITORING A SEATED PERSON

(75) Inventor: Gaby Bader, Göteborg (SE)

(73) Assignee: Biosys AB, Gothenburg (SE)

( * ) Notice: Subject to any disclaimer, the term of this patent is extended or adjusted under 35 U.S.C. 154(b) by 0 days.

(21) Appl. No.: 09/410,351

(22) Filed: Sep. 30, 1999

(30) Foreign Application Priority Data

Oct. 1, 1998 (SE) .................................................. 9803344

(51) Int. Cl.$^7$ .................................................. G08B 13/14
(52) U.S. Cl. .................. 340/573.1; 340/667; 280/728.1; 180/271; 180/273
(58) Field of Search .............................. 340/573.1, 425.5, 340/576, 667, 457.1; 280/728.1, 730.1, 730.2, 734, 735, 807; 180/271, 273, 268

(56) References Cited

U.S. PATENT DOCUMENTS

| 4,569,536 | 2/1986 | Tsuge et al. ............................ 280/807 |
| 5,232,248 | 8/1993 | Talbott ................................... 283/81 |
| 5,311,197 | * 5/1994 | Sorden et al. ......................... 342/457 |
| 5,404,128 | 4/1995 | Ogino et al. ........................ 340/425.5 |
| 5,474,327 | 12/1995 | Schousek ............................. 280/735 |
| 5,612,876 | 3/1997 | Zeidler et al. ................. 364/424.055 |
| 5,724,024 | 3/1998 | Sonderegger et al. ................ 340/562 |
| 5,785,347 | * 7/1998 | Adolph et al. ......................... 280/735 |
| 5,845,000 | 12/1998 | Breed et al. ........................... 382/100 |
| 5,871,232 | * 2/1999 | White .................................... 280/735 |
| 5,914,675 | * 6/1999 | Tognazzini ............................ 340/989 |
| 6,007,095 | * 12/1999 | Stanley ................................. 280/735 |

* cited by examiner

Primary Examiner—Daniel J. Wu
Assistant Examiner—Toan Pham
(74) Attorney, Agent, or Firm—Nixon & Vanderhye P.C.

(57) ABSTRACT

For estimating a person's age and for providing an emergency alarm function, a stationary pressure sensitive means (2, 3, 4) contacts part of that person's (1) body, and generates a signal in correspondence to that person's body movements relative to said means. A detector/filter circuit (5) connected to said means, separates signals corresponding to true body movements, heartbeat-related body movements, and respiration-related body movements. Calculation and comparison circuits (6, 9; 7, 10; 8, 11) are adapted to receive these signals and compare them with previously received signals to determine possible changes. A correlator (12) correlates the output signals from the calculation and comparison circuits to produce a resulting change signal which is compared with a preset threshold in a threshold detector circuit (13). The output signals can be used for activating/inactivating an air-bag system or for triggering an emergency alarm via a mobile telephone and a GPS system.

15 Claims, 3 Drawing Sheets

METHOD AND AN APPARATUS FOR MONITORING A SEATED PERSON

TECHNICAL FIELD

The present invention relates to a method and an apparatus for monitoring a seated person, in particular a person seated in a vehicle equipped with an air-bag system.

BACKGROUND OF THE INVENTION

In conventional safety systems in, for example, cars, air-bags are integrated as a part of the system. Air-bags are designed as a supplement to other safety devices, such as belts and deformation zones provided in the car.

An air-bag is a device which is rapidly inflated with gas in the event that a vehicle is involved in a collision, in order to reduce the damages on the persons/passengers travelling inside the vehicle.

However, in some situations, the use of an air-bag has turned out not to provide an increased safety for the passenger. Thus, if an un-belted child is seated on the passenger seat and the air-bag is activated during a collision, it has turned out that the activation of the air-bag causes the passenger more damage than would be the result if the air-bag had remained inactivated.

Furthermore, if the passenger is an adult it has turned out that the air-bag should be activated, regardless of whether or not the passenger wears a seat-belt or not. Thus, it is insufficient to sense if the passenger wears a seat-belt or not, the age of the passenger must also be determined for the air-bag system to provide maximum security.

Also, the International patent application WO 95/00368 discloses a device for detecting the presence of a person in a seat, for example in a vehicle. According to WO 95/00368, two electrodes are provided on opposite sides of the thorax of the seated person. The two electrodes together with the thorax forms a capacitor, where the thorax acts as the dielectric. When the person is breathing the characteristics of the capacitor changes, whereby the changing of the characteristics can be measured. The use of the device according to WO 95/00368 can make it possible to distinguish between different animal, such as between a human and a dog.

However, the device as described in WO 95/00368 has a number of drawbacks. Thus, the device does not enable to distinguish between a human child and an adult. Also, the capacitor used for deriving the measured signal has drawbacks. For example, if a person seated in a seat of a vehicle is wearing a jacket, the characteristics of the dielectric in the capacitor will change, possibly resulting in a malfunction of the detection system.

Thus, the is a problem of how to in a secure manner determine the age of a seated person, in particular of a person seated in a vehicle equipped with an air-bag system.

SUMMARY

It is an object of the present invention to provide a method and an apparatus for monitoring a seated person so that his/her age can be estimated, and to do this regardless of what clothes the seated person is wearing.

It is another object of the present invention to provide a method and a system for facilitating rescuing of a seated person in an emergency situation.

This object and others are obtained by means of monitoring a corresponding relationship between the cardiac/respiratory function and a person's body movements, and possibly also other physiological parameters, in order to estimate the age of the person when seated in a seat. The sensors used for detecting the physiological parameters can be located in the seat and preferably also in a seat belt used by the seated person.

Furthermore, the sensors used for measured physiological parameters can also be connected to an alarm system. The alarm system is arranged to compare the sensed physiological parameters with threshold values stored in a memory in the alarm system. If such a threshold value is exceeded, the alarm system triggers an alarm, which is transmitted to an alarm central, for example using a cellular radio system.

The advantage of the invention is that, by means of the method, the apparatus and the system according to the invention, it is possible, in an efficient manner, to monitor and estimate the age of persons seated in different types of vehicles (cars/buses/trains/boats/aircrafts) without disturbing the monitored person in that also the body movements of the monitored person can be taken into account, and also to trigger an alarm if the passenger suddenly would become ill or injured, such if the vehicle he/she is travelling in is involved in an accident.

BRIEF DESCRIPTION OF THE DRAWINGS

The present invention will be described in more detail and with reference to the accompanying drawings, in which.

DETAILED DESCRIPTION

Figure 1:
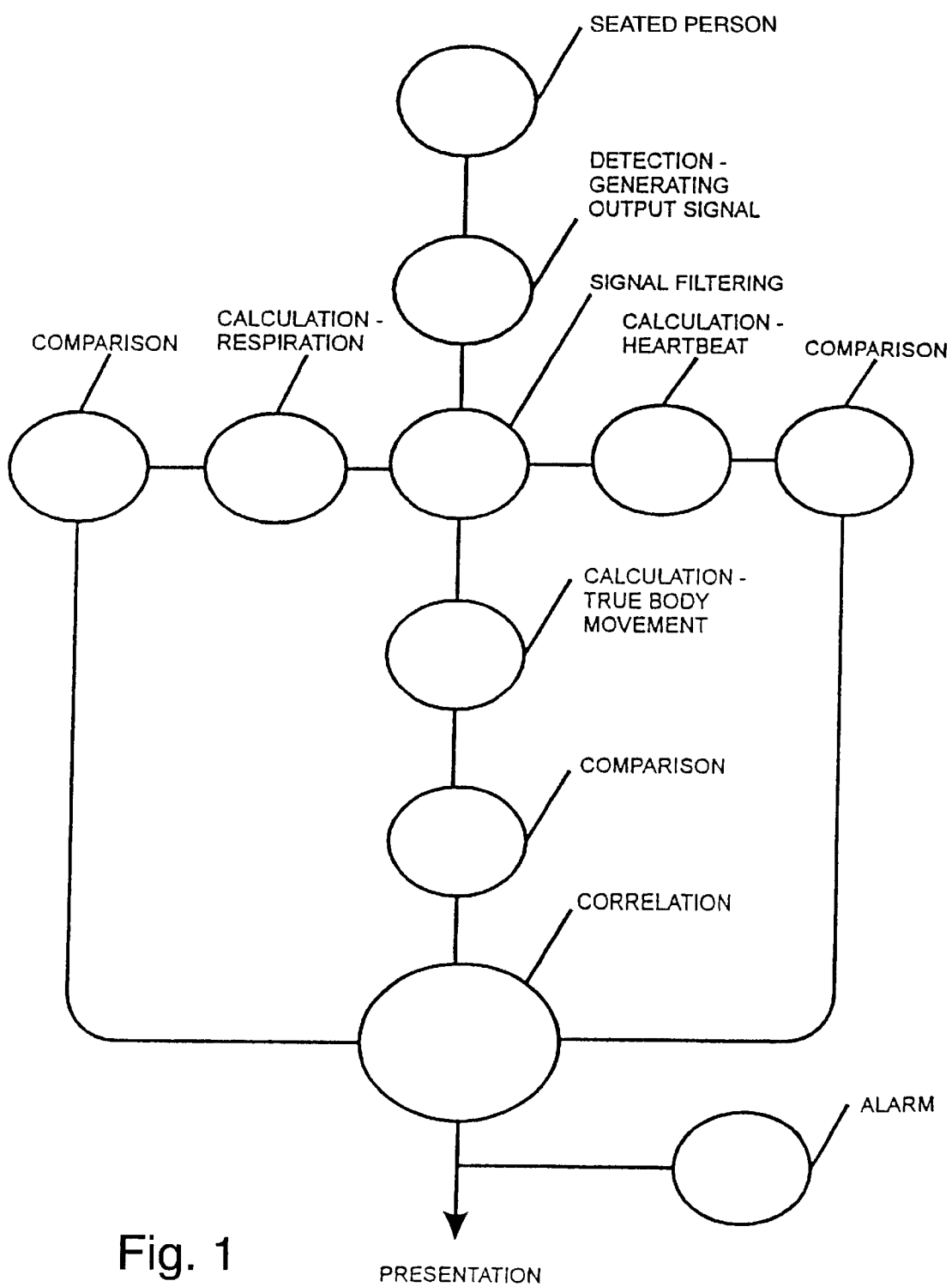
FIG. 1 shows a flow chart of the method according to the invention.

A process in accordance with the method according to the invention is described below with reference to FIG. 1. The described method is normally implemented by means of soft-ware. A person is sitting in a vehicle, such as a car. Pressure sensitive, stationary plates or sensors are installed in the seat or the back of the seat and where appropriate possibly in a safety belt. The plates can be PVDF films possibly in combination with electrostatic plates. The body movements of the seated person cause different pressures against the plates which continuously register the pressure and the movements.

In a manner known per se, the plates generate electrical output signals which are detected and analyzed. Besides movements of the body, also the cardiac function and the respiratory function can be detected by means of these output signals. The amplitude and rate of the cardiac function are detected as are the amplitude and rate of the respiratory function. Depending on the age of the monitored person, the magnitude of these parameters varies. The signals are now to be analyzed and can either be analyzed directly or be stored in a memory for later transmission or be transferred simultaneously by wireless communication to a personal computer for storing and further processing of data.

Analysis and processing of the signals take place continuously in a system which is designed for the purpose and coupled to the plates via wires or wirelessly connected to the plates, in which system each signal is analyzed independently of the other signals. The rate and amplitude of each heartbeat-related or respiration-related body movement, are calculated. The time intervals between two successive signals, are measured. Upon registering true body movements, the duration of the movements as well as the magnitude of the movements, are measured. Moreover, the time interval between movements is measured. The body movements are classified in accordance with duration and magnitude.

Moreover, in the system, the variations in time interval, amplitude and rate for each heartbeat and respiration, are compared with corresponding values for persons of different age stored in a look-up table in the system.

It is possible to recognize, whether it is a small child or an adult person who is sitting, by studying the parameters of the autonomic nerve system such as heart and respiratory activities: e.g. it is well known that babies and small children have at rest higher heart rate than adults.

In order to obtain further information, it is also possible to register the pressure of the person's head against a head rest, if any.

The system continuously compares processed data with the previously obtained standard material. Based on this information a signal is transmitted to the air-bag system of the vehicle so that the air-bag system is inactivated if it is determined that the monitored person is a child who is not wearing a seat-belt.

Analysis and processing of data are carried out by means of a computer system controlled by an analysis program. When needed, the program reconstructs all signals which can then be presented on a screen (not shown) connected to the system. Also, the final result can be presented in the form of histograms or statistic tables.

Figure 2:
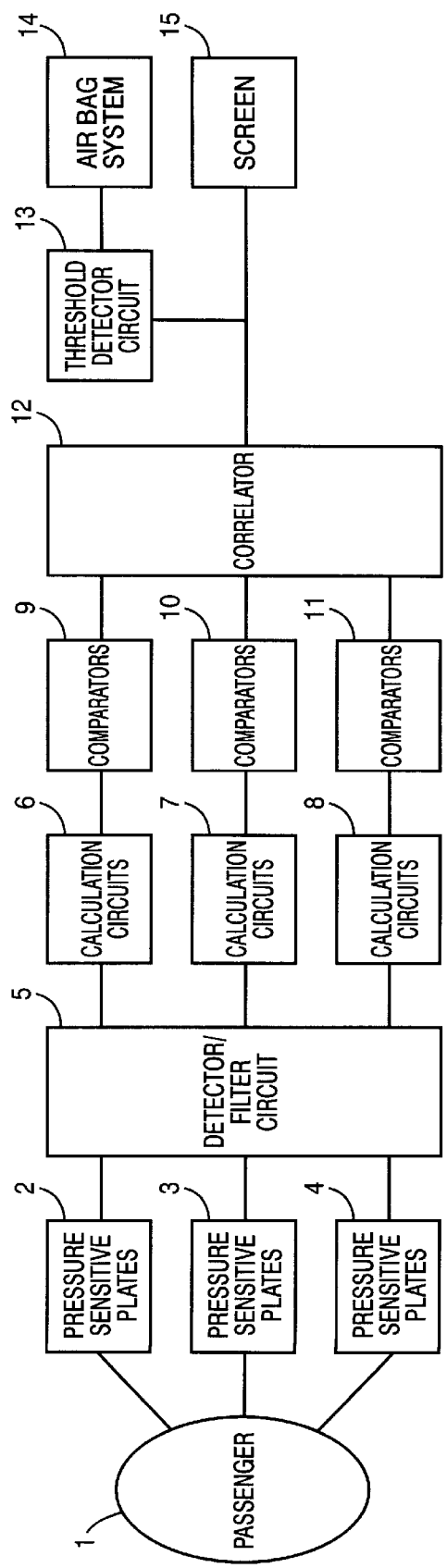
FIG. 2 shows a block diagram of an embodiment of an apparatus according to the invention.

In FIG. 2, in the form of a block diagram, an embodiment of an apparatus according to the invention, is shown. The embodiment relates to monitoring a passenger 1 of a vehicle. As mentioned above, the passenger 1 is in contact with pressure sensitive plates 2–4, which detect the passenger's 1 body movements. The plates 2–4 generate output signals which are detected and filtered in respect of signal type in a detector/filter circuit 5. The different signal types are those corresponding to true body movements, heartbeat-related body movements and respiration-related body movements. From output terminals on the filter circuit 5, the signals are supplied to input terminals of calculation circuits 6–8 for calculation, in the circuit 6, of rate and amplitude for each heartbeat as well as the time interval between the heart beats, in the circuit 7, of rate and amplitude for each respiration as well as the time interval between the respirations, and, in the circuit 8, of the duration and magnitude of a true body movement as well as the time interval between true body movements. Comparison circuits (comparators) 9–11 receive on their input terminals, output signals from the circuits 6–8 and compare for each function, i.e. heartbeat-related body movements, respiration-related body movements, and true body movements, the time interval variation, the variation in amplitude for heartbeat-related body movements and respiration-related body movements, respectively, with corresponding values for registered heartbeats and respirations, respectively, stored in memory means not shown.

A corresponding comparison is done in the circuit 11 for the duration, magnitude and variation of time intervals for true body movements. Thus, the output signals from the circuits 9–11 are controlled by said parameters and are supplied to input terminals of a correlator 12 in which the parameters are correlated to typical parameters of persons of different age. Since a direct relationship exists between the parameters and a persons age, this correlation will provide an output signal indicative of the age of the monitored person.

By means of a threshold detector circuit 13, a signal activates/inactivates an air-bag system 14 provided at the seat where the monitored person is seated. 15 designates a visual presentation device, e.g. a screen.

Figure 3:
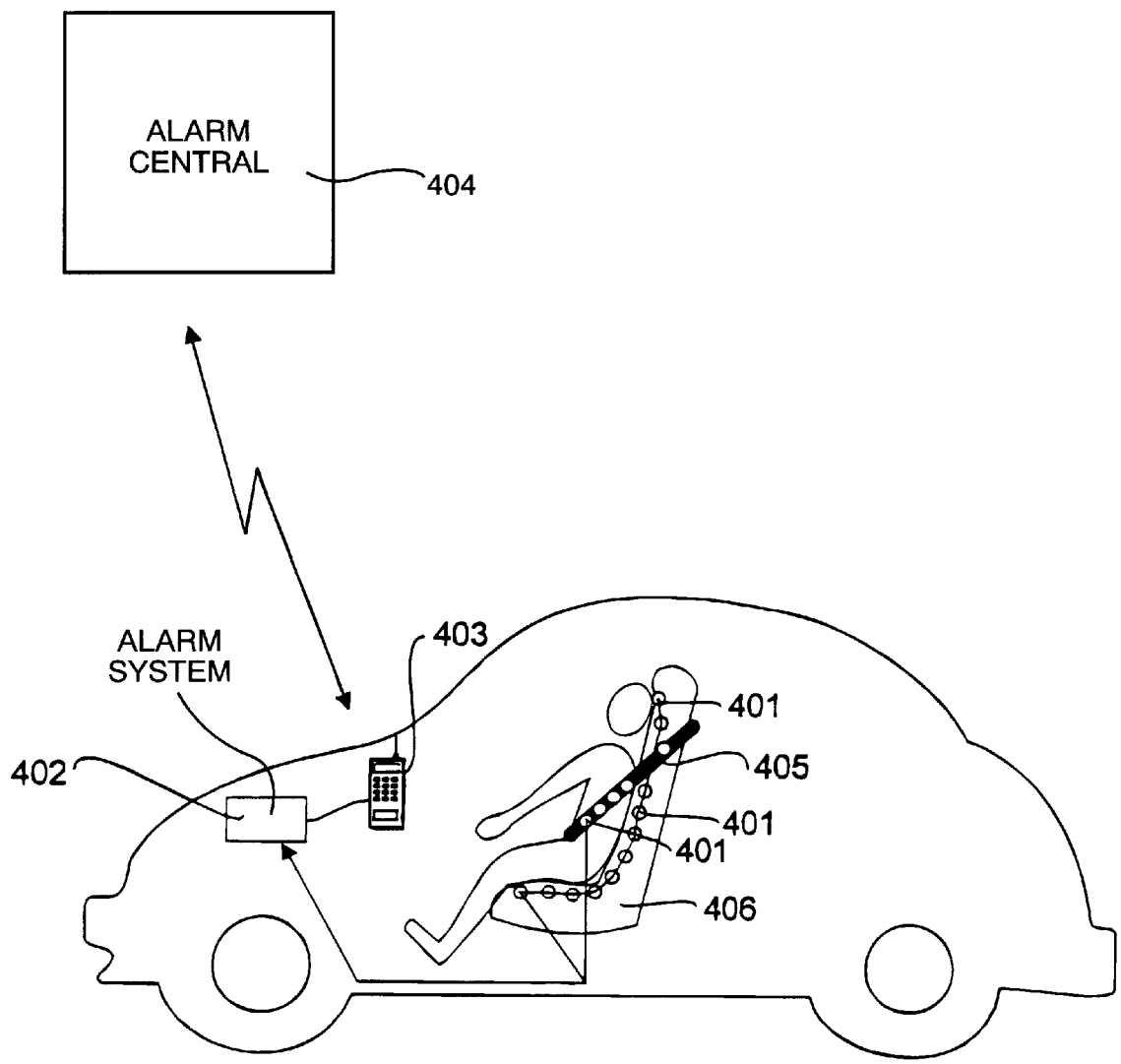
FIG. 3 is a schematic view of an alarm system.

In FIG. 3, a schematic view of a person seated in a car is shown. The person is seated in a seat 406 and wears a seat-belt 505, which both can comprise sensors or plates 401 as described above. The sensors 401 can, as described above, be connected to an air-bag system of the vehicle (not shown). The sensors can also be connected to an alarm system 402. The alarm system is connected to a cellular telephone 403 and possibly also to a GPS navigation system (not shown). The telephone 403 can connect to an alarm central 404 over an air interface. Thus, if the vehicle in which the person is travelling in should be involved in an accident and the person would be injured the alarm system would sense that the physiological parameters of the person were abnormal and would trigger an alarm, which would be transmitted via the cellular telephone 403 to the alarm central 404.

In a preferred embodiment he alarm central 404 would then continuously have access to all the physiological parameters sensed by the senors 401 which then continuously would be transmitted to the alarm central via the telephone 403.

In yet another preferred embodiment the vehicle is equipped with a GPS navigation system (not shown). The alarm central 404 would then also have an exact location of the vehicle and could direct emergency personnel directly to the location of the accident.

The use of the method, apparatus and system as described herein increases the safety of persons travelling in vehicles in many aspects. Thus, safety systems, such as air-bags are only activated if it is determined that the activation is likely to increase the safety of the person. Also if an emergency situation should arise an alarm is automatically triggered and emergency personnel can already on their way to the scene of the accident have access to vital information on the physiological parameters of an injured person.

What is claimed is:

1. A method of monitoring and estimating the age of a person seated in a seat of a vehicle having an air bag system comprising:

(a) generating an electrical signal in response to at least one of the heartbeats and other physiological parameters of the person;

(b) comparing the electrical signal in (a) with data stored in a memory;

(c) determining, based on the outcome of the comparison in (b), if the person is a child or an adult, and (d) issuing a signal indicating the outcome of the determination in (c) to the air bag system of the vehicle.

2. A system for monitoring and estimating the age of a person, seated in a seat of a vehicle having an air bag system comprising:

at least one stationary pressure sensitive element which may directly or indirectly contact at least a portion of a person's body, and which individually generates an electrical signal on an output terminal in response to at least one of the person's heartbeats and other physiological parameters of the person;

a detector/filter circuit connected to the output terminal of said at least one stationary pressure sensitive element which separates and outputs signals relating to heartbeat information on corresponding output terminals;

a correlator connected to said detector/filter circuit and having an output terminal;

a threshold detector circuit connected to said output terminal of said correlator and which compares the resulting change sensed by said at least one pressure sensitive element with a preset threshold value and having an output terminal; and a device connected to said output terminal of said threshold detector circuit and which activates/inactivates an air bag system in the vehicle, when said preset threshold is reached.

3. A system according to claim 2 wherein said at least one pressure sensitive element comprises at least one pressure sensitive plate of PVDF film.

4. A system according to claim 3 wherein said at least one pressure sensitive element is installed in at least one of a seat, a back rest, and a safety belt, in the vehicle.

5. A system as recited in claim 3 further comprising an alarm system which issues an alarm signal if a physiological parameter sensed by said at least one pressure sensitive element becomes abnormal.

6. A system according to claim 5 further comprising a mobile telephone connected to said alarm system which connects to an alarm central in case an alarm signal is issued.

7. A system according to claim 2 wherein said at least one pressure sensitive element comprises at least one pressure sensitive plate of PVDF film in combination with at least one electrostatic plate.

8. A system according to claim 7 wherein said at least one pressure sensitive element is installed in at least one of a seat, a back rest, and a safety belt, in the vehicle.

9. A system as recited in claim 7 further comprising an alarm system which issues an alarm signal if a physiological parameter sensed by said at least one pressure sensitive element becomes abnormal.

10. A system according to claim 2 wherein said at least one pressure sensitive element is installed in at least one of a seat, a back rest, and a safety belt, in the vehicle.

11. A system as recited in claim 10 further comprising an alarm system which issues an alarm signal if a physiological parameter sensed by said at least one pressure sensitive element becomes abnormal.

12. A system as recited in claim 2 further comprising an alarm system which issues an alarm signal if a physiological parameter sensed by said at least one pressure sensitive element becomes abnormal.

13. A system according to claim 12 further comprising a mobile telephone connected to said alarm system which connects to an alarm central in case an alarm signal is issued.

14. A system according to claim 12 further comprising a GPS system connected to said alarm system for locating the vehicle.

15. A system according to claim 13 further comprising a GPS system connected to said alarm system for locating the vehicle.

* * * * *